(12) United States Patent
Nakajyo et al.

(10) Patent No.: US 7,564,757 B2
(45) Date of Patent: Jul. 21, 2009

(54) OPTICAL DISK RECORDING APPARATUS

(75) Inventors: Yukihisa Nakajyo, Kanagawa-ken (JP); Morito Morishima, Shizuoka-ken (JP)

(73) Assignee: Yamaha Corporation, Hamamatsu-shi (JP)

(*) Notice: Subject to any disclaimer, the term of this patent is extended or adjusted under 35 U.S.C. 154(b) by 569 days.

(21) Appl. No.: 10/831,606

(22) Filed: Apr. 23, 2004

(65) Prior Publication Data
US 2005/0018575 A1    Jan. 27, 2005

(30) Foreign Application Priority Data
Apr. 25, 2003    (JP)    ............ P. 2003-122086

(51) Int. Cl.
*G11B 7/00*    (2006.01)
(52) U.S. Cl. ............... 369/59.11; 369/273; 369/116; 369/47.5; 369/59.24; 347/105
(58) Field of Classification Search ............ 369/116, 369/273, 59.24, 47.5; 347/105
See application file for complete search history.

(56) References Cited
U.S. PATENT DOCUMENTS

| | | | | |
|---|---|---|---|---|
| 5,608,718 A | * | 3/1997 | Schiewe | 369/275.4 |
| 6,507,557 B1 | * | 1/2003 | Ohno et al. | 369/275.3 |
| 6,532,034 B2 | * | 3/2003 | Hirotsune et al. | 347/229 |
| 7,015,939 B2 | * | 3/2006 | Honda et al. | 347/225 |
| 7,082,094 B2 | * | 7/2006 | Morishima et al. | 369/116 |
| 7,129,968 B2 | * | 10/2006 | Morishima | 347/253 |
| 2003/0161224 A1 | * | 8/2003 | Anderson et al. | 369/30.58 |
| 2004/0062179 A1 | * | 4/2004 | Tsurumi et al. | 369/108 |
| 2004/0125730 A1 | * | 7/2004 | Yamamoto | 369/59.24 |

FOREIGN PATENT DOCUMENTS

| | | |
|---|---|---|
| EP | 1 041 563 A1 | 10/2000 |
| EP | 1 049 079 A1 | 11/2000 |
| EP | 1 274 084 A2 | 1/2003 |

* cited by examiner

*Primary Examiner*—Wayne R Young
*Assistant Examiner*—Linh T Nguyen
(74) *Attorney, Agent, or Firm*—Morrison & Foerster LLP

(57) ABSTRACT

The optical disk recording apparatus includes: a strategy circuit for converting recording data into a pulse train signal for defining an irradiation timing of laser light by using one of first and second conversion rules for forming different marks; a control unit for changing the conversion rule used for the strategy circuit after a timing of forming a contour of an image has passed at the time of forming the image on an optical disk, and when a timing of addition of a synchronization pattern to EFM data has arrived; and a current selecting unit for selecting a current in accordance with the pulse train signal based on the strategy circuit and for supplying it to a semiconductor laser.

10 Claims, 7 Drawing Sheets

FIG. 5
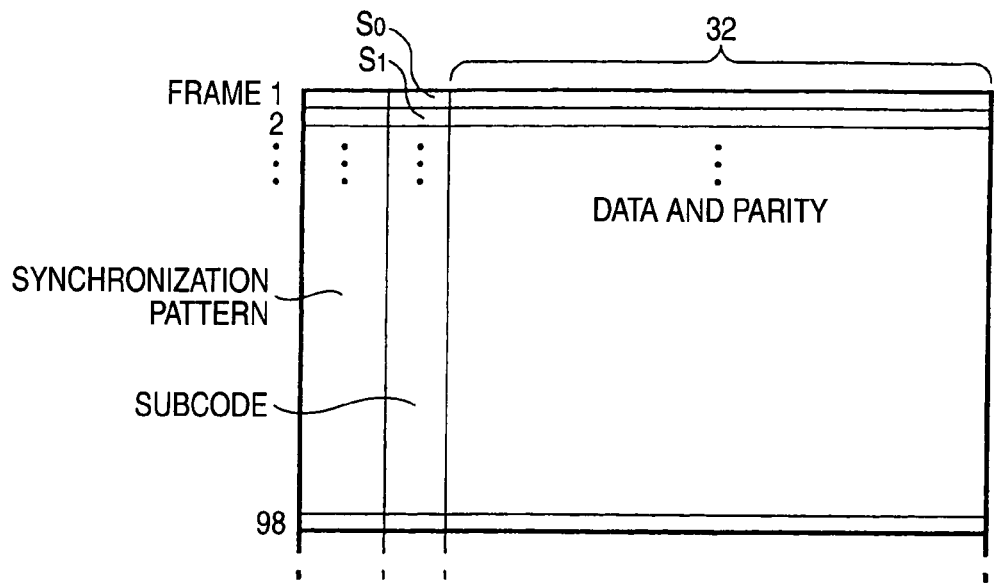
FIG. 6A
FIG. 6B
FIG. 6C
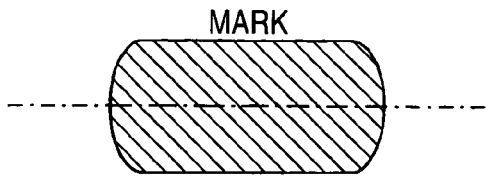
FIG. 6D
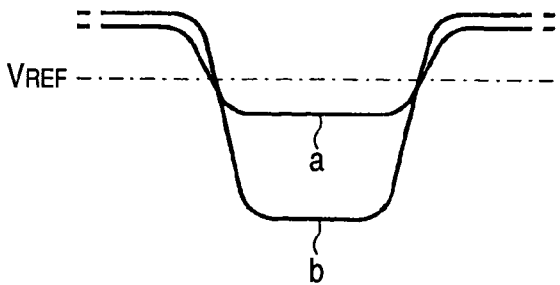
FIG. 6E

OPTICAL DISK RECORDING APPARATUS

BACKGROUND

1. Field of Invention

The present invention relates to an optical disk recording apparatus for recording data and forming a visible image with respect to an optical disk such as a CD-R.

2. Description of Related Art

A helical guide groove called a groove is provided in an optical disk such as a CD-R (Compact Disk-Recordable). When data is recorded, high-level laser light is intermittently applied along this groove, and a recording layer is thereby discolored to form marks. At the time of reproduction, low-level laser light is applied along the groove. The reflected light level of the laser light does not change much in a land where the mark has not been formed, but the reflected light level of the laser light declines in a portion where the mark has been formed. Therefore, by determining whether or not the level of the reflected light is at a fixed reference level or higher, it becomes possible to reproduce data. It should be noted that the mark referred to herein means one which has an effect optically equivalent to an embossed pit in an optical disk for reproduction only.

Meanwhile, in recent years, in addition to the technique of recording data, a technique of forming a visible image has also been proposed. In this technique, the mark in a rendering area is formed by being corrected so as to become thicker (or thinner) than the mark in a non-rendering area. The reflectivity of the rendering area is thereby made different from that of the non-rendering area, and a visible image is represented by using this difference in reflectivity (e.g., refer to patent documents 1 and 2).

Patent Document 1
JP-A-09-312021

Patent Document 2
JP-A-11-134648

Incidentally, in the optical disk, data is recorded in the EFM (Eight to Fourteen Modulation) format so that the marks or lands will not continue, it should naturally suffice if the laser is turned on and off in accordance with the EMF data. However, to form the marks in accurate lengths, it is common practice to correct the irradiation timing of the laser light in accordance with a conversion rule (correction rule) called a strategy. For this reason, a scheme was conceived for changing over the strategy between the rendering area and the non-rendering area.

However, since the mark forming operation and the image forming operation are essentially unrelated to each other, cases can occur in which the rendering area is changed over to the non-rendering area during the formation of marks in the rendering area in accordance with the rendering rule, or in which the non-rendering area is conversely changed over to the rendering area during the formation of marks in the non-rendering area. In such a case, the strategy is also changed over suddenly, with the result that discontinuous bits are formed. Hence, a drawback has been pointed out in that a read error is induced.

SUMMARY OF THE INVENTION

The invention has been devised in view of the above-described circumstances, and its object is to provide an optical disk recording apparatus in which read errors of data are prevented in a case where an image is represented by causing the reflectivity to differ according to the shape of the mark.

In order to solve the aforesaid object, the invention is characterized by having the following arrangement.

(1) An optical disk recording apparatus for forming marks by irradiating an optical disk with laser light to form a visible image on the optical disk together with recording data to the optical disk, the optical disk recording apparatus comprising:

a strategy circuit which converts recording data into a pulse train signal for defining an irradiation timing of the laser light according to one of a plurality of conversion rules under each of which, marks of different width are formed, a changing unit which changes the conversion rule used for the strategy circuit from one of the conversion rules to another, when one of a portion for which complementation of the recording data is possible and a portion for which the discarding of a reproduction signal is negligible has arrived after a timing of forming a contour of an image has passed when forming the image on the optical disk; and an irradiation controlling unit which controls the irradiation of the laser light according to the pulse train signal based on the strategy circuit.

(2) The optical disk recording apparatus according to (1), wherein a synchronization pattern is added to the recording data, which is supplied to the strategy circuit, and the changing unit changes the conversion rule used for the strategy circuit form one of the conversion rules to the other when the synchronization pattern has been supplied to the strategy circuit after the timing of forming the contour of the image has passed.

(3) The optical disk recording apparatus according to (1), wherein a subcode is added to the recording data, which is supplied to the strategy circuit, and the changing unit changes the conversion rule used for the strategy circuit form one of the conversion rules to the other when the subcode has been supplied to the strategy circuit after the timing of forming the contour of the image has passed.

(4) A method of forming a row of marks by irradiating an optical disk with laser light, the method comprising the steps of:

determining a rule changing timing that one of a portion for which complementation of the recording data is possible and a portion for which the discarding of a reproduction signal is negligible has arrived;

changing conversion rule from one of conversion rules to another when the rule changing timing is determined, the marks formed by irradiating the optical disk with the laser light according to the respective conversion rules having different width;

converting recording data into a pulse train signal for defining an irradiation timing of the laser light according to the changed conversion rule; and controlling the irradiation of the laser light according to the pulse train signal.

(5) An optical disk recording apparatus for recording data on an optical disk based on recording data and for forming an image on the optical disk based on image data by irradiating the optical disk with laser light, the optical disk recording apparatus comprising:

a encoder which converts the recording data into a recording format data constituted of a plurality of attributes of data, and converts the recording format data into a pulse train signal for defining an irradiation timing of the laser light according to a conversion rule which defines a width of the marks formed by irradiating the optical disk with the laser light;

a determining unit which monitors the recording format data and determines a rule changing timing according to the attribute of the data of the recording format data;

a changing unit which changes the conversion rule based on the rule changing timing and the image data; and an irradiation controlling unit which controls the irradiation of the laser light according to the pulse train signal.

(6) The optical disk recording apparatus according to (5), wherein the attributes of the data includes the recording data, a synchronization pattern and a subcode, and the synchronization pattern and the subcode are added to the recording data when the recording data is converted into the pulse train signal.

(7) The optical disk recording apparatus according to (6), wherein the detecting unit determines the rule changing timing when the synchronization pattern has been supplied to the encoder after a timing of forming the contour of the image has passed.

(8) The optical disk recording apparatus according to (6), wherein the detecting unit determines the rule changing timing when the subcode has been supplied to the encoder after a timing of forming the contour of the image has passed.

(9) The optical disk recording apparatus according to (5), wherein the attributes of the data include a first attribute allowing the conversion rule to be changed and a second attribute inhibiting the conversion rule from being changed.

(10) The optical disk recording apparatus according to (9), wherein a synchronization pattern and a subcode belong to the first attribute and the recording data belongs to the second attribute.

BRIEF DESCRIPTION OF THE DRAWINGS

FIG. 5 is a diagram explaining a subcode format;

FIGS. 6A to 6E are diagrams for explaining marks formed by the optical disk recording apparatus;

DETAILED DESCRIPTION OF PREFERRED EMBODIMENTS

Figure 1:
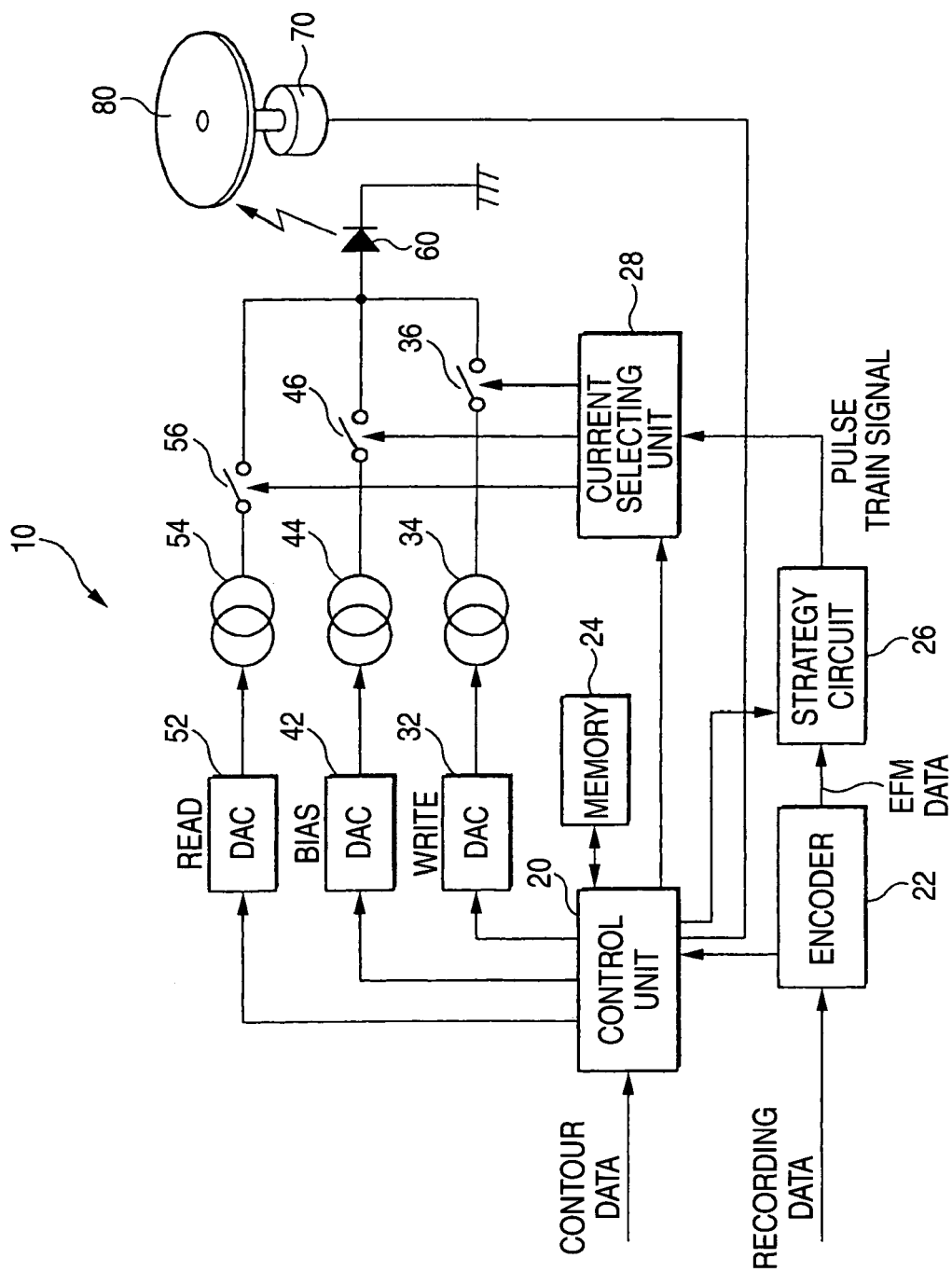
FIG. 1 is a block diagram illustrating the configuration of essential portions of an optical disk recording apparatus in accordance with an embodiment of the invention.

Referring now to the drawings, a description will be given according to an embodiment of the invention. FIG. 1 is a block diagram illustrating the configuration of essential portions of an optical disk recording apparatus in accordance with the embodiment.

An optical disk 80 such as a CD-R which is subject to data recording and image formation is set in this optical disk recording apparatus 10. This optical disk 80 is rotated by a spindle motor 70. Here, an unillustrated rotation detector is attached to the spindle motor 70 to supply to a control unit 20 a detection signal accompanied by a predetermined number of pulses each time the spindle motor 70 undergoes one revolution. The control unit 20 multiplies the frequency of this detection signal, and detects that the optical disk 80 has rotated by a fixed angle each time the pulses are outputted in the multiplied signal. For example, when the multiplication factor of the detection signal is "450" in a case where 8 pulses are outputted each time the spindle motor 70 undergoes one revolution, the pulse period of that multiplied signal corresponds to a duration during which the optical disk 80 rotates by 0.1 degree (–360÷8÷450). Therefore, each time the pulses in the multiplied signal are outputted, the control unit 20 detects that the optical disk 80 has rotated by 0.1 degree.

Contour data inputted to the control unit 20 is a signal which is set to the H level if the irradiation spot of the laser light with respect to the optical disk 80 is the rendering area, and set to the L level if the irradiation spot is the non-rendering area. For this reason, in a case where its logical level has shifted from the L level to the H level, it shows that the irradiation spot of the laser light has shifted from the non-rendering area to the rendering area. Meanwhile, in a case where its logical level has shifted from the H level to the L level, it shows that the irradiation spot of the laser light has shifted from the rendering area to the non-rendering area. In either case, the shift in the logical level shows a timing of forming a contour portion in the case where an image is formed on the optical disk 80.

Figure 2:
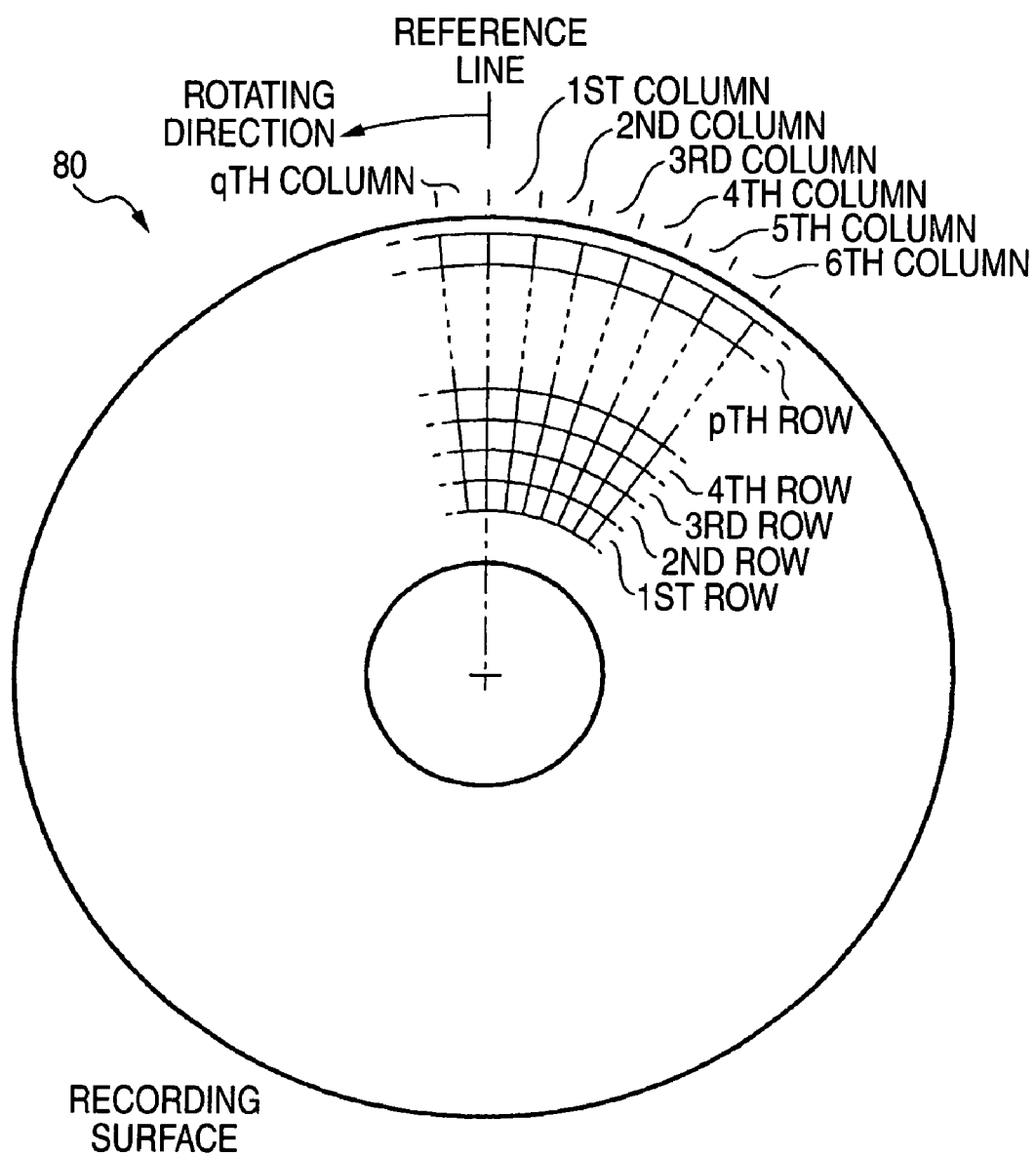
FIG. 2 is a diagram illustrating polar coordinates of the optical disk.

Here, as shown in FIG. 2, an image to be formed on the optical disk 80 is defined by polar coordinates in which circumferential directions of the optical disk 80 are sequentially set as row 1, row 2, row 3, . . . , and row p, as viewed from the inner periphery toward the outer periphery, and are sequentially set as column 1, column 2, column 3, . . . , and column q in the order in which the optical disk 80 is rotated counterclockwise. Further, the image is represented by whether or not a dot defined by these polar coordinates is to be rendered. For this reason, the rendering area refers to the area of the dot to be rendered in the aforementioned polar coordinates.

Figure 3:
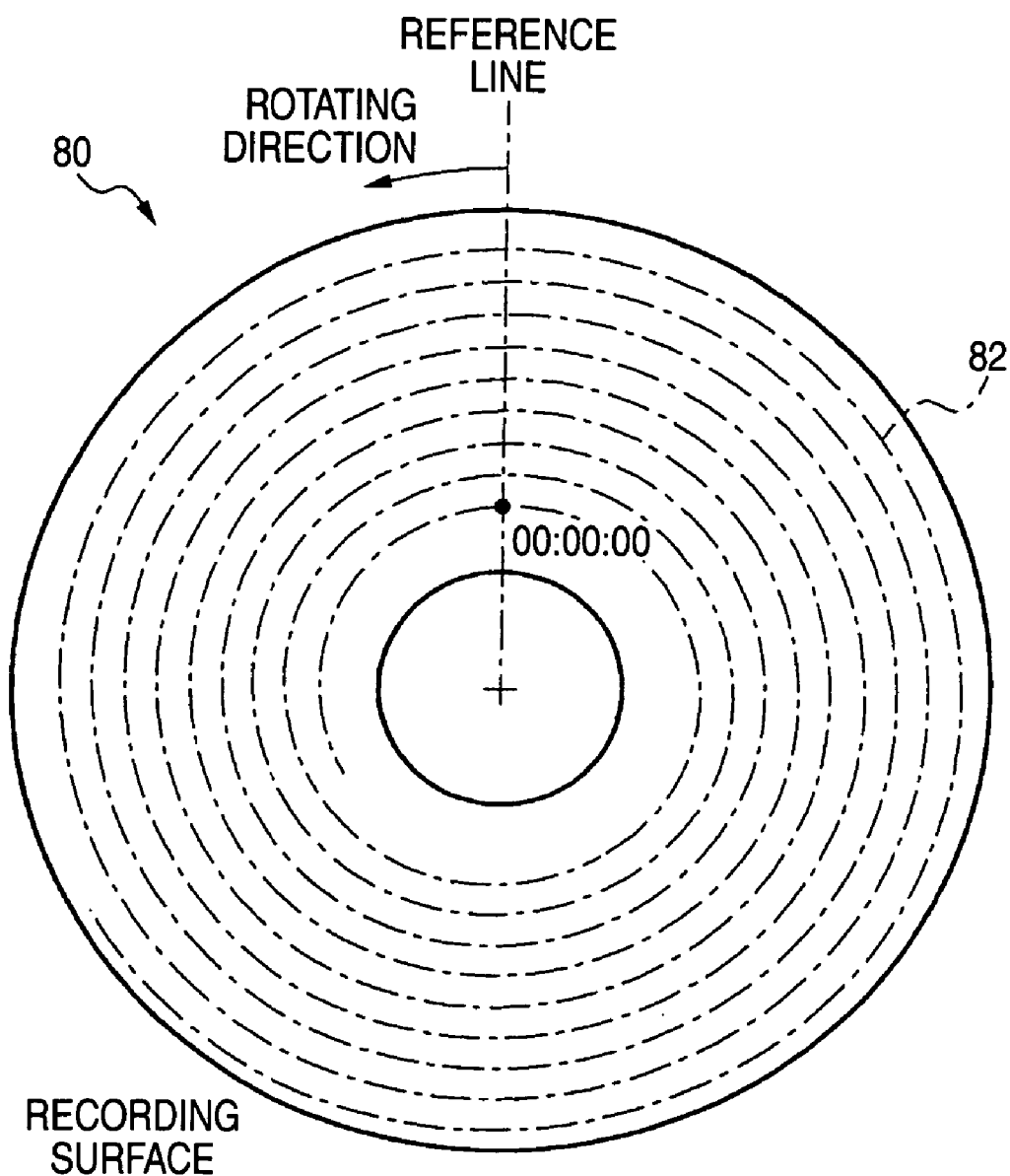
FIG. 3 is a diagram illustrating the configuration of a groove in the optical disk.

As shown in FIG. 3, a groove 82 is formed in the optical disk 80 helically in the clockwise direction from the inner peripheral side toward the outer peripheral side. Here, the optical disk 80 is rotated counterclockwise, tracking control is provided to allow the irradiation spot of the laser light to trace the groove 82, and the relative irradiation intensity of the laser light is controlled, thereby forming marks.

Incidentally, the reference line shown in FIG. 2 is a phantom line which should serve as a column reference at a time when the irradiation spot of the laser light ascertains the coordinates in the polar coordinate system. In this embodiment, for example, upon detecting that the time information (ATIP: Absolute Time In Pregroove) obtained by demodulating the wobble state of the groove is zero hour, zero minute, and zero second, a determination is made that the timing when a first pulse is outputted by the rotation detector is the timing when the irradiation spot of the laser light has passed the reference line. Thereafter, a determination is made that each time eight pulses are outputted from the rotation detector, the optical disk 80 has undergone one revolution, and the irradiation spot of the laser light has passed the reference line.

Then, after this timing of the passage of the reference line, by counting the pulses of the multiplied signal in the above-described manner, it is possible to ascertain at which row of the dots the irradiation spot of the laser light is positioned.

On the other hand, although in FIG. 2 the dot size is enlarged for the sake of explanation, in a case where the resolution of the image is 250 dpi (dots per inch), for example, the size of one dot becomes about 0.1 mm square. In the case of the CD-R, the interval of the groove 82 (track interval) is 1.6 μm, so that one dot straddles 63 tracks. Accordingly, in terms of this example, it follows that when the reference line has been passed 63 times, the irradiation spot of the laser light has moved by a one-dot portion in the radially outward direction. For this reason, upon detecting that the time information is zero hour, zero minute, and zero second, if upcounting is effected each time the number of times of passage of the reference line reaches the number of times equal to the number of tracks straddled by one dot, it is possible to ascertain at which row of the dot the irradiation spot of the laser light is positioned.

Thus it is possible to ascertain at which row and which column of the dot the irradiation spot of the laser light is positioned. The contour data supplied to the control unit 20 is one in which the dot data corresponding to the dot where the irradiation spot of the laser light is positioned is read from a buffer memory.

It should be noted that the dot data is obtained by transforming the bit map data virtually assigned to the optical disk into the aforementioned polar coordinates in a host computer, for example. Incidentally, the dot data transformed into polar coordinates is temporarily stored in the unillustrated buffer memory in the optical disk recording apparatus 10.

Meanwhile, EFM (Eight to Fourteen Modulation) data outputted from an encoder 22 is one obtained by subjecting recording data supplied from the host computer to 8-14 bit conversion, and CIRC (Cross Interleave Reed-Solomon Code) is employed as the code error correction system. The encoder 22 consecutively converts this EFM data into a recording format shown in FIGS. 4 and 5, and outputs it. Incidentally, the recording data corresponds to a signal or data, such as video signal, audio signal and data for computer, which are recorded as contents of the optical disk.

Figure 4:
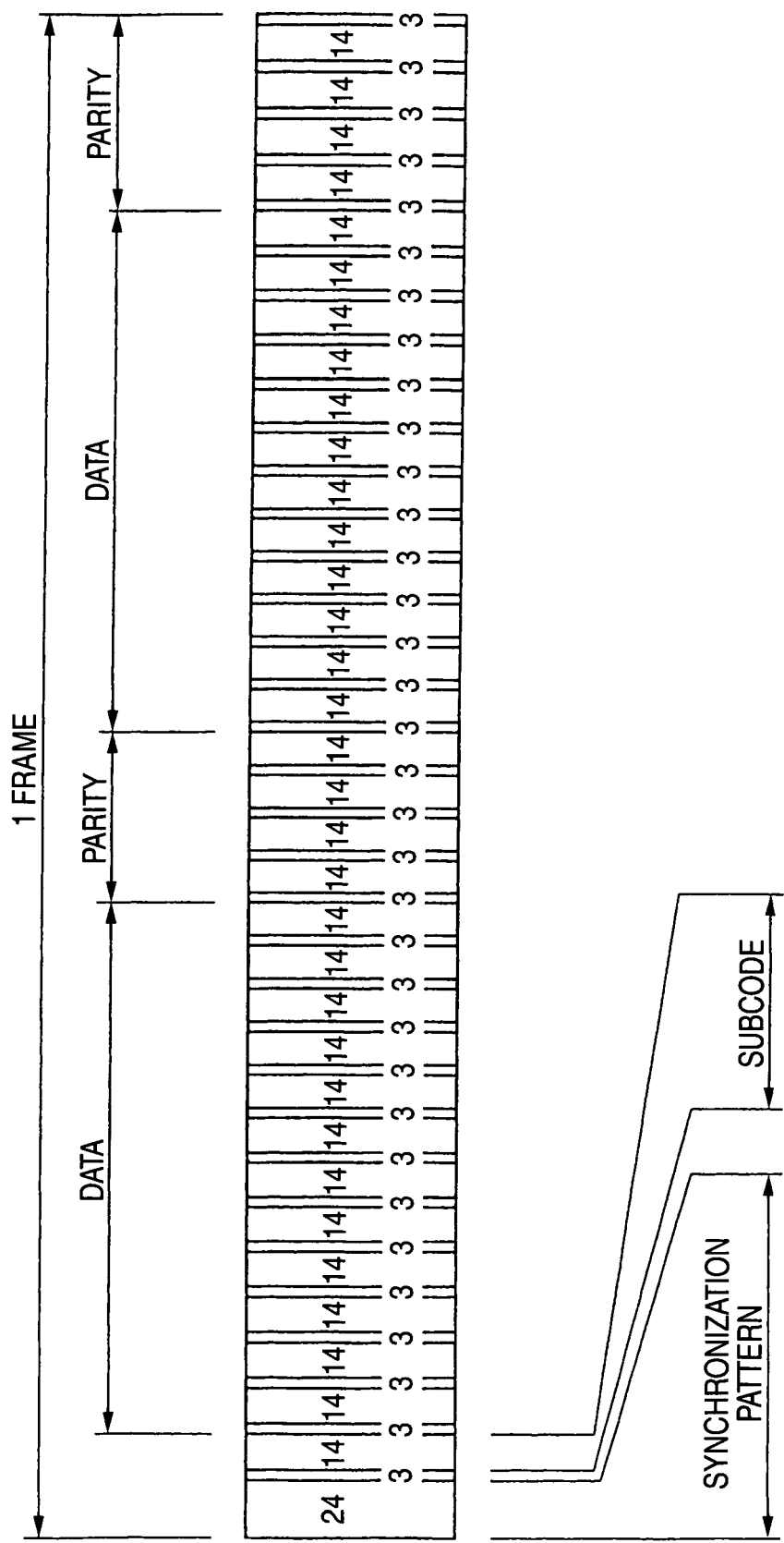
FIG. 4 is a diagram for explaining a frame format.

Specifically, as shown in FIG. 4, the encoder 22 first adds 8 symbols as a parity to the EM data of 24 symbols (1 symbol is 14 bits), adds a 24-bit synchronization pattern for synchronization and a subcode of 1 symbol, and further adds 3 bits for coupling between each symbol (the synchronization pattern is also regarded as a 24-bit symbol), thereby forming one frame (a total of 588 bits).

Here, as the synchronization pattern of 24 bits, if a notation is adopted in which the data is inverted at Is, a pattern which is expressed by the following is selected;

100000000001000000000010

Figure 7:
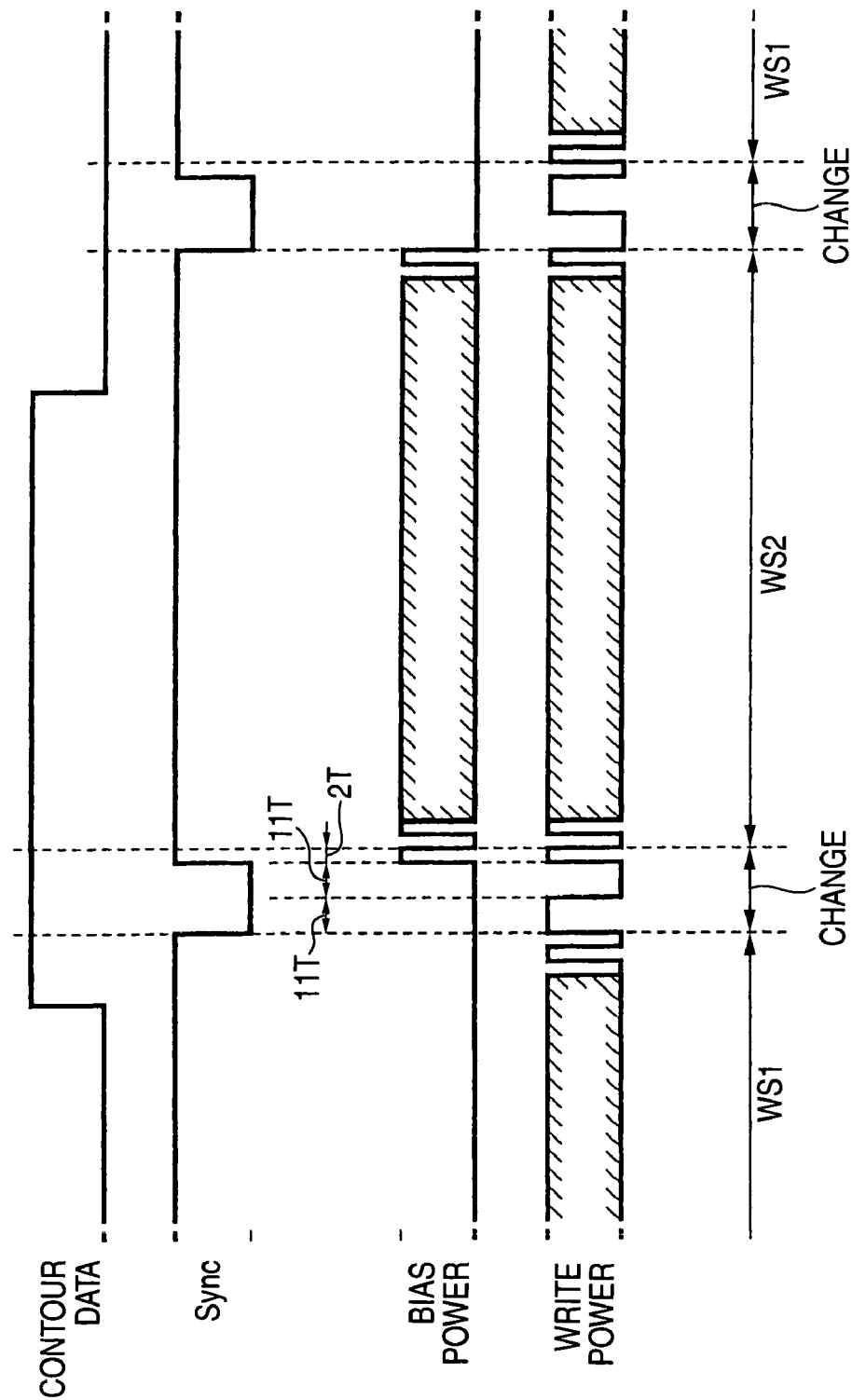
FIG. 7 is a timing chart illustrating the contents of control of the optical disk recording apparatus.

If a unit period corresponding to 1 bit is designated by T, the period during which this synchronization pattern is supplied is expressed as "11T/11T/2T." The encoder 22 supplies to the control unit 20 a signal Sync which is set to the L level in the period "11T/11T" of the period "11T/11T/2T" during which the synchronization pattern is to be added (see FIG. 7).

Further, the encoder 22 groups 98 such frames into one unit and sets them as 1 block, as shown in FIG. 5. It should be noted that, to identify leading portions of subcodes of one block, the subcode in the first frame and the subcode in the second frame are respectively used as synchronization signals $S_0$ and $S_1$. Here, the blocked subcodes are data having an additional property which is used in display or random access in a case where music data is recorded.

First write strategy information WS1 and second write strategy information WS2 are stored in a memory 24. Of these items, the first write strategy information WS1 is a conversion rule in the non-rendering area where the dot is not rendered, and is information which defines a first conversion rule for converting the data framed by the encoder 22 into a pulse train indicating the irradiation timing of the laser light. The second write strategy information WS2 is a conversion rule in the rendering area where the dot is rendered, and is information which defines a second conversion rule of the contents for narrowing the irradiation period of the laser light more than the first write strategy information WS1.

Here, it is assumed that in a case where a portion of the framed data has been converted into a pulse train signal for maintaining an irradiation level W for an irradiation period T1 by the first conversion rule such as the one shown in FIG. 6A, the mark which is formed in accordance with that pulse train signal has a shape such as the one shown in FIG. 6B.

The same data is converted into a pulse train signal for maintaining the level (=W+B) with a fixed level B added to the irradiation level W for an irradiation period T2 by the second conversion rule such as the one shown in FIG. 6C. The mark which is formed in accordance with that pulse train signal has a shape such as the one shown in FIG. 6D, and the mark becomes thicker in comparison with FIG. 6B. It should be noted that the mark being thick means that the distance in a direction (in the radial direction of the optical disk) perpendicular to the groove 82 is large, and is not an absolute but a relative expression.

It should be noted that although the marks in FIGS. 6B and 6D are shown to have fixed densities, in actuality the marks tend to become leaner in a direction from the central portion toward an outer peripheral portion of the mark.

Here, the second write strategy information WS2 and the irradiation level of the laser light in the rendering area are not merely for making the marks thick. Namely, the second write strategy information WS2 and the irradiation level of the laser light in the rendering area are set such that when these marks are irradiated with the laser light with an intensity corresponding to the irradiation level of read power information, reproduction signals obtained by slicing the intensities of the reflected light by a fixed reference level $V_{REF}$ become identical to each other, as shown in FIG. 6E. It should be noted that a in the drawing shows the intensity of the reflected light from the mark based on the first write strategy information WS1, and b in the drawing shows the intensity of the reflected light from the mark based on the second write strategy information WS2.

In reality, however, there are many cases where the degree of discoloration differs if the type of the optical disk 80 differs. For this reason, the first write strategy information WS1 and information indicating the irradiation level of the laser light in the non-rendering area are prepared in a plurality of sets according to the types of optical disks 80, and an appropriate one is selected for each type.

The control unit 20 supplies to a DAC 32 information indicating the irradiation level W of the laser light in the non-rendering area for write power use, and supplies to a DAC 42 information indicating the level B, i.e., a difference in which the irradiation level w of the laser light is subtracted from the irradiation level (W+B) of the laser light in the rendering area, for bias power use. Incidentally, the control unit 20 supplies to a DAC 52 information indicating the irradiation level of the laser light for data reproduction for read use.

The DACs 32, 42, and 52 respectively convert the information supplied thereto into voltage signals. Constant current sources 34, 44, and 54 respectively supply constant currents corresponding to the voltage signals. Switches 36, 46, and 56 respectively select the constant current sources 34, 44, and 54, and their on-off states are respectively controlled by a current selecting unit 28.

A semiconductor laser (laser diode) 60 is provided for an unillustrated optical pickup. For this reason, the light emitted by the semiconductor laser 60 is focused onto the groove 82 in the optical disk 80. Here, the currents of the constant current sources selected by the switches 36, 46, and 56 are added and supplied to the semiconductor laser 60.

Incidentally, in a case where data is recorded in the CAV (Constant Angular Velocity) format, the more outwardly on the optical disk 80 the irradiation spot of the laser light is located, the higher the peripheral speed, so that it is necessary to increase the irradiation level of the laser light necessary for the formation of marks. For this reason, there are cases where correction is provided so that the contents of information supplied to the DACs 32 and 42 become higher as the irradiation spot of the laser light moves outwardly on the optical disk 80. Such correction may be executed by the DACs 32, 42, and 52 or by the constant current sources 34, 44, and 54.

Meanwhile, the control unit 20 changes over one of the first conversion rule and the second conversion rule to the other, and sets it in a strategy circuit 26, as will be described later.

The strategy circuit 26 converts the EFM data framed by the encoder 22 into a pulse train signal for defining the irradiation timing of the laser light by using the conversion rule set by the control unit 20.

During data recording, when the first conversion rule is set in the strategy circuit 26, and the pulse train signal converted by the strategy circuit 26 is at the H level, the current selecting unit 28 turns on only the switch 36. When the second conversion rule is set in the strategy circuit 26, and the pulse train signal is at the H level, the current selecting unit 28 turns on both the switches 36 and 46. On the other hand, when the converted pulse train signal is at the L level, the current selecting unit 28 turns off all the switches 36, 46, and 56 irrespective of the conversion rule set in the strategy circuit 26. It should be noted that the current selecting unit 28 constantly turns on only the switch 56 during data reproduction.

Next, a description will be given of the data recording and image forming operation of the optical disk recording apparatus 10.

First, the control unit 20 starts the rotation of the spindle motor 70 and moves the optical pickup, thereby reading characteristic information (media code) of the optical disk 80. Then, the control unit 20 reads from the memory 24 the first write strategy information WS1 corresponding to the characteristic information thus read, and sets the first conversion rule indicated by that information in the strategy circuit 26 as an initial state. Further, the control unit 20 supplies the aforementioned information to the DACs 32, 42, and 52, respectively.

Subsequently, in the state in which dot data is stored in the buffer memory, the encoder 22 frames the EFM data and supplies it to the strategy circuit 26.

In addition, if it is detected that the time information is zero hour, zero minute, and zero second, as described above, the coordinates of the dot at which the irradiation spot of the laser light is positioned are ascertained, and dot data corresponding to that dot is supplied to the control unit 20 as the contour data.

Here, in a case where the contour data is at the L level, as shown in FIG. 7, the strategy circuit 26 converts the framed EFM data into a pulse train signal for defining the irradiation timing of the laser light in accordance with the first conversion rule set in the initial state, while the current selecting unit 28 turns on or off the switch 36 in response to the H or L level of that pulse train signal. Accordingly, when the switch 36 is on, only the current corresponding to write power flows across the semiconductor laser 60, so that a relatively thin mark is formed.

Meanwhile, in the case where the contour data has changed from the L level to the H level, the control unit 20 maintains the set state of the strategy circuit 26 until the signal Sync supplied from the encoder 22 assumes the L level. Accordingly, even if the contour data changes to the H level, the first conversion rule is applied until the signal Sync assumes the L level.

Here, when the signal Sync has assumed the L level, i.e., when the encoder 22 has added and supplied the synchronization pattern to the strategy circuit 26, the control unit 20 reads the second write strategy information WS2 from the memory 24. Then, when the signal Sync has assumed the H level again, i.e., when the final period "2T" of the period "11T/11T/2T" of the synchronization pattern has arrived, the control unit 20 sets in the strategy circuit 26 the second conversion rule defined by the second write strategy information WS2 which was read, and allows the current selecting unit 28 to turn on the switch 46.

For this reason, the strategy circuit 26 converts the framed EFM data into a pulse train signal in accordance with the second conversion rule, while the current selecting unit 28 turns on or off both the switches 36 and 46 in response to the H or L level of that pulse train signal. Accordingly, when the switches 36 and 46 are on, the current in which bias power is added to write power flows across the semiconductor laser 60, so that a relatively thick mark is formed.

Next, in the case where the contour data has changed from the H level to the L level again, the control unit 20 maintains the set state of the strategy circuit 26 until the signal Sync supplied from the encoder 22 assumes the L level. Accordingly, even if the contour data changes to the L level, the second conversion rule is applied until the signal Sync assumes the L level.

Here, when the signal Sync has assumed the L level, the control unit 20 reads again the first write strategy information WS1 from the memory 24. Then, when the signal Sync has assumed the H level again, the control unit 20 sets in the strategy circuit 26 the first conversion rule defined by the first write strategy information WS1 which was read, and inhibits the current selecting unit 28 from turning on the switch 46.

For this reason, the strategy circuit 26 converts again the framed EFM data into a pulse train signal in accordance with the first conversion rule, while the current selecting unit 28 turns on or off the switch 36 in response to the H or L level of that pulse train signal. Accordingly, the operation returns to that of forming a relatively thin mark.

Thereafter, similar operation is repeated each time the logical level of the contour data changes.

In light of the above description, this controlling operation can be briefly expressed so that timing of changeover from one of the first conversion rule and the second conversion rule to the other is set when the synchronization pattern has been supplied to the encoder after a timing of forming the contour of the image has passed.

Accordingly, in this embodiment, in the case where the first conversion rule is applied, as shown in FIG. 7, the mark is formed by the current of write power, whereas in the case where the second conversion rule is applied, the mark is formed by the current in which bias power is added to write power.

Figure 8A:
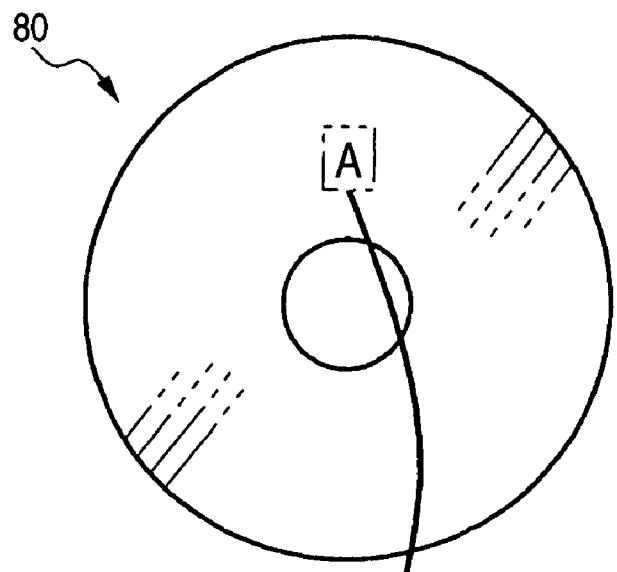
FIGS. 8A to 8C are diagrams illustrating an example of data recording by the optical disk recording apparatus.
Figure 8B:
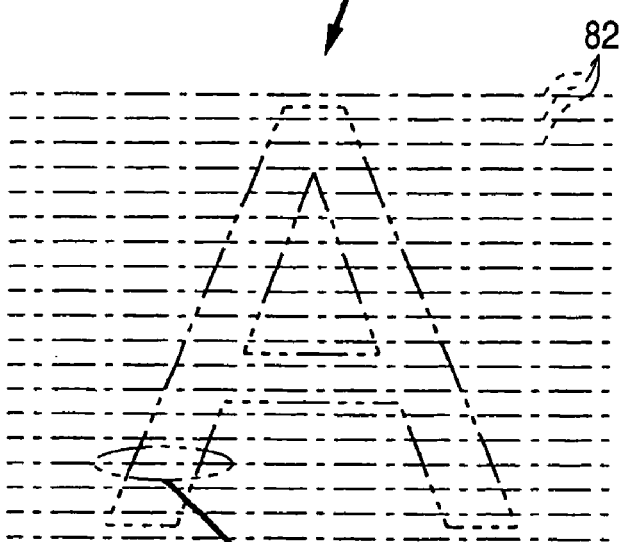
Figure 8C:
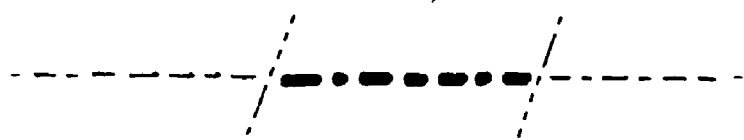

For this reason, in a case where the letter "A" is depicted on the optical disk 80, as shown in FIG. 8A, the dots making up that letter "A" are formed by thick marks, as shown in FIGS. 8B and 8C, so that the quantity of the reflected light decreases correspondingly. On the other hand, the dots making up the background of the letter "A" are formed by thin marks, so that the quantity of the reflected light increases correspondingly. For this reason, the letter "A" is expressed darkly against a bright background.

In this embodiment, the timing of changeover from one of the first conversion rule and the second conversion rule to the other is the period when the synchronization pattern is added. Therefore, marks corresponding to the 24-symbol EFM data and the 8-symbol parity are not discontinuously formed. On the other hand, although in this embodiment discontinuous marks are possibly formed during the period of addition of the synchronization pattern, even if discontinuous marks are formed as the synchronization pattern, they can be complemented by a reproducing apparatus. The method of complementing the synchronization pattern employs the well-known technique. For example, according to a window method, a dummy synchronization signal is inserted to a signal position where the original synchronization signal should exist. "Disposal of reproducing signal" means the same effect.

Furthermore, as for both thick marks and thin marks, the results of slicing the intensities of the reflected light by the reference level $V_{REF}$ are identical. Hence, the frequent occurrence of read errors during data reproduction can be prevented.

In addition, with the optical disk recording apparatus in accordance with this embodiment, the turning on of the switch 46 is inhibited during the period when the signal Sync is at the L level. During this period, therefore, bias power is not added, as shown in FIG. 7 For this reason, during the period 11T/11T when the signal Sync is at the L level, only the current corresponding to write power is forcibly supplied to the semiconductor laser in either the first half or latter half of that period. Hence, during this supply period, well-known ROPC (Running Optimum power Control) for searching an optimum irradiation level with write power may be executed by effecting trial writing while changing the irradiation level and by reading that trial-written portion.

During the period when the signal Sync is at the L Level, a period may be forcibly provided during which, conversely, the current selecting unit 28 inhibits the off state of the switch 46 and bias power is added to write power During that period, an optimum irradiation level may be searched with write power plus bias power.

In cases where data is written to a CD-RW by using the optical disk recording apparatus 10 in accordance with this embodiment, marks can be formed with write power by switching the constant current source 34. As for the deleting of data, it is possible to crystallize the groove with write power plus bias power by turning on the constant current sources 34 and 44. For this reason, with respect to the optical disk recording apparatus 10, data recording and deleting functions of the CD-RW can be added by merely changing the switch control contents in the current selecting unit 28 without needing to separately add constituent elements.

It should be noted that although in this embodiment the timing of changeover from one of the first conversion rule and the second conversion rule to the other is set to be the period when the synchronization pattern is supplied, the reason is to ensure that the 24-symbol EFM data and the 8-symbol parity are not affected. As such a timing at which these items are not affected, it is possible to cite, for instance, the period when the subcode of one symbol is supplied in each frame (see FIG. 4), as well as supplying timings of the subcode $S_0$ in the first frame and the subcode $S_1$ in the second frame in each block.

Here, only error detection is effected with respect to the subcodes, and when an error is detected, the subcode is discarded. However, since the data is continuous data, an interpolation is possible by using values before and after that error. For this reason, the discarding of the subcode when the error is detected is negligible.

In other words, under the assumption that the recording data, the synchronization pattern and the subcode are attributes of the recording format, timing of changeover from one of the first conversion rule and the second conversion rule to the other is set according to the attribute of the recording format. That is, the recording data is an attribute allowing the conversion rule to be changed and the synchronization pattern and the subcode are attributes inhibiting the conversion rule from being changed.

With the optical disk recording apparatus 10 in accordance with this embodiment, the arrangement provided is such that thick dots are formed in the rendering area, while thin dots are formed in the non-rendering area. Conversely, an arrangement may be provided such that thin dots are formed in the rendering area, while thick dots are formed in the non-rendering area.

Further, an image may be represented not as a binary image in which dots are rendered or not rendered, but with three or more gradations by preparing in advance three or more sets each of which consists of write strategy information for defining the conversion rules and information for defining the irradiation level of the laser light, and in which the results of the operation in which intensities of the reflected light from the marks formed by the conversion rules and at the irradiation level are sliced by the reference level $V_{REF}$ become identical.

Although the CD-R is assumed to be used in the foregoing embodiment, data recording and image formation may be performed simultaneously with respect to other optical disks such as the DVD-R (Digital Versatile Disk-Recordable).

As described above, in accordance with the invention, it is possible to prevent read errors of data in the case where an image is represented by causing the reflectivity to differ according to the shape of the mark.

What is claimed is:

1. An optical disk recording apparatus for forming marks by irradiating an optical disk with laser light to form a visible image on the optical disk together with recording data to the optical disk, the optical disk recording apparatus comprising:
    a strategy circuit which converts recording data into a pulse train signal for defining an irradiation timing of the laser light according to one of a plurality of conversion rules under each of which, marks of different width are formed,
    a changing unit which changes the conversion rule used for the strategy circuit from one of the conversion rules to another, when one of a portion for which complementation of the recording data is possible and a portion for which the discarding of a reproduction signal is negligible has arrived after a timing of forming a contour of an image has passed when forming the image on the optical disk; and
    an irradiation controlling unit which controls the irradiation of the laser light according to the pulse train signal based on the strategy circuit.

2. The optical disk recording apparatus according to claim 1, wherein a synchronization pattern is added to the recording data, which is supplied to the strategy circuit, and
    the changing unit changes the conversion rule used for the strategy circuit form one of the conversion rules to the other when the synchronization pattern has been supplied to the strategy circuit after the timing of forming the contour of the image has passed.

3. The optical disk recording apparatus according to claim 1 wherein a subcode is added to the recording data, which is supplied to the strategy circuit, and
    the changing unit changes the conversion rule used for the strategy circuit form one of the conversion rules to the other when the subcode has been supplied to the strategy circuit after the timing of forming the contour of the image has passed.

4. An optical disk recording apparatus of claim 1, further comprising:
   a encoder which converts the recording data into a recording format data constituted of a plurality of attributes of data, and converts the recording format data into a pulse train signal for defining an irradiation timing of the laser light according to a conversion rule which defines a width of the marks formed by irradiating the optical disk with the laser light;
   a determining unit which monitors the recording format data and determines a rule changing timing according to the attribute of the data of the recording format data;
   a changing unit which changes the conversion rule based on the rule changing timing and the image data; and
   an irradiation controlling unit which controls the irradiation of the laser light according to the pulse train signal.

5. The optical disk recording apparatus according to claim 4, wherein the attributes of the data includes the recording data, a synchronization pattern and a subcode, and
   the synchronization pattern and the subcode are added to the recording data when the recording data is converted into the pulse train signal.

6. The optical disk recording apparatus according to claim 5, wherein the detecting unit determines the rule changing timing when the synchronization pattern has been supplied to the encoder after a timing of forming the contour of the image has passed.

7. The optical disk recording apparatus according to claim 5, wherein the detecting unit determines the rule changing timing when the subcode has been supplied to the encoder after a timing of forming the contour of the image has passed.

8. The optical disk recording apparatus according to claim 4, wherein the attributes of the data include a first attribute allowing the conversion rule to be changed and a second attribute inhibiting the conversion rule from being changed.

9. The optical disk recording apparatus according to claim 8, wherein a synchronization pattern and a subcode belong to the first attribute and the recording data belongs to the second attribute.

10. A method of forming a row of marks by irradiating an optical disk with laser light to form a visible image on the optical disk together with recording data to the optical disk, the method comprising the steps of:
    determining a rule changing timing that one of a portion for which complementation of the recording data is possible and a portion for which the discarding of a reproduction signal is negligible has arrived after a timing of a contour of an image has passed when forming the image on the optical disk;
    changing conversion rule from one of conversion rules to another when the rule changing timing is determined, the marks formed by irradiating the optical disk with the laser light according to the respective conversion rules having different width;
    converting recording data into a pulse train signal for defining an irradiation timing of the laser light according to laser light according to the changed conversion rule; and
    controlling the irradiation of the laser light according to the pulse train signal.

* * * * *